United States Patent
Godlewsky et al.

(10) Patent No.: US 7,104,364 B2
(45) Date of Patent: Sep. 12, 2006

(54) ELECTRICALLY ACTUATABLE VEHICLE BRAKE AND METHOD FOR CONTROLLING AN ELECTRICALLY ACTUATABLE VEHICLE BRAKE

(75) Inventors: Gregor Godlewsky, Bendorf (DE); Thomas Maur, Weitersburg (DE); Michael Keller, Traisen (DE); Ralf Leiter, Vallendar (DE); Ralf Kinder, Eitelborn (DE); Gregor Poertzgen, Koblenz (DE)

(73) Assignee: Lucas Automotive GmbH, (DE)

( * ) Notice: Subject to any disclaimer, the term of this patent is extended or adjusted under 35 U.S.C. 154(b) by 0 days.

(21) Appl. No.: 11/126,902

(22) Filed: May 11, 2005

(65) Prior Publication Data

US 2005/0212355 A1    Sep. 29, 2005

Related U.S. Application Data

(60) Division of application No. 10/946,497, filed on Sep. 21, 2004, which is a continuation of application No. PCT/EP03/02970, filed on Mar. 21, 2003.

(30) Foreign Application Priority Data

Mar. 21, 2002 (DE) .............................. 102 12 618
Jun. 24, 2002 (DE) .............................. 102 28 115

(51) Int. Cl.
*F16D 55/08* (2006.01)
*F16D 66/02* (2006.01)

(52) U.S. Cl. .................. 188/1.11 L; 188/72.8

(58) Field of Classification Search .......... 188/1.11 E, 188/158–162, 1.11 L, 72.8
See application file for complete search history.

(56) References Cited

U.S. PATENT DOCUMENTS

| 3,377,076 | A | 4/1968 | Burnett |
| 3,421,604 | A | 1/1969 | Hobbs |
| 6,003,640 | A | 12/1999 | Ralea |
| 6,164,422 | A | 12/2000 | Sanitate et al. |
| 6,238,011 | B1 | 5/2001 | Heckmann |
| 6,250,436 | B1 * | 6/2001 | Oikawa et al. ............ 188/72.1 |
| 6,279,694 | B1 * | 8/2001 | Bohm et al. ................ 188/162 |
| 6,293,370 | B1 * | 9/2001 | McCann et al. ........... 188/71.8 |
| 6,325,182 | B1 * | 12/2001 | Yamaguchi et al. ....... 188/72.8 |
| 6,394,235 | B1 | 5/2002 | Poertzgen et al. |
| 6,439,351 | B1 | 8/2002 | Sanitate et al. |
| 6,471,015 | B1 | 10/2002 | Ralea et al. |
| 6,536,562 | B1 | 3/2003 | Böhm et al. |
| 2003/0029680 | A1 | 2/2003 | Ralea et al. |

FOREIGN PATENT DOCUMENTS

| DE | 1 600 008 | 1/1970 |
| DE | 195 36 695 | 4/1997 |
| DE | 196 39 686 | 4/1998 |
| DE | 197 30 094 | 1/1999 |
| DE | 198 26 053 | 12/1999 |
| DE | 198 35 550 | 2/2000 |
| DE | 199 47 903 | 8/2000 |
| EP | 1 186 495 | 3/2002 |
| FR | 1504679 | 12/1967 |
| WO | 99/05011 | 2/1999 |

* cited by examiner

*Primary Examiner*—Christopher P. Schwartz
(74) *Attorney, Agent, or Firm*—MacMillan, Sobanski & Todd, LLC

(57) ABSTRACT

An electrically driven vehicle brake comprises a brake piston, which acts on at least one friction lining and can be displaced out of an initial position into an actuation position, in which the brake piston abuts the friction lining against a rotating member of the vehicle brake which is to be connected, fixed against rotation, to a wheel of the motor vehicle, and a transmission unit, driven by an electric motor and acting on the brake piston to actuate the brake piston, wherein the electric motor is to be triggered by an electronic control unit, which is also set up to detect performance parameters of the vehicle, the electric motor and/or the vehicle brake. The electronic control unit is set up and programmed to trigger the electric motor by means of a control and evaluation program running in it in such a way that the brake piston is displaced in response to the detecting of at least one predetermined operating condition in a first direction into its actuation position, in which the at least one friction lining abuts against the rotating member, and the brake piston is then displaced by a path corresponding to a predetermined, desired brake release play in a second direction opposite the first direction, into its initial position. If the vehicle brake additionally comprises a device for fixing the initial position of the brake piston, which fixes the initial position of the brake piston in such a way that a predetermined, desired brake release play is kept constant during the operating life of the brake, the electronic control unit is set up and programmed to trigger the electric motor by means of a control and evaluation program running in it in such a way that an element of the transmission unit acting on the brake piston on electrical actuation of the brake is displaced in response to the detecting of at least one predetermined operating condition in a first direction into its actuation position, in which the brake piston actuated by the element abuts the at least one friction lining against the rotating member. The element is then displaced by a path corresponding to a sum made up of the predetermined, desired brake release play and a predetermined, desired distance between the element and the brake piston when the brake is not actuated in a second direction opposite the first direction into its initial position.

18 Claims, 10 Drawing Sheets

Fig. 4  Determining the actuation position

ELECTRICALLY ACTUATABLE VEHICLE BRAKE AND METHOD FOR CONTROLLING AN ELECTRICALLY ACTUATABLE VEHICLE BRAKE

CROSS REFERENCE TO RELATED APPLICATIONS

This application is a divisional of U.S. patent application Ser. No. 10/946,497, filed Sep. 21, 2004, the disclosures of which are incorporated herein by reference, which was a continuation of International Application No. PCT/EP03/02970 filed Mar. 21, 2003, the disclosures of which are incorporated herein by reference, and which claimed priority to German Patent Application No. 102 12 618.6, filed Mar. 21, 2002, the disclosures of which are incorporated herein by reference, and German Patent Application No. 102 28 115.7, filed Jun. 24, 2002, the disclosures of which are incorporated herein by reference.

BACKGROUND TO THE INVENTION

The invention relates to an electrically actuatable vehicle brake and a method for controlling an electrically actuatable vehicle brake. The vehicle brake comprises a brake piston, which acts on at least one friction lining and can be displaced out of an initial position into an actuation position in which the brake piston abuts the friction lining against a rotating member of the vehicle brake which is to be connected, fixed against rotation, to a wheel of the motor vehicle, and a transmission unit, driven by an electric motor and acting on the brake piston, to actuate the brake piston, wherein the electric motor is to be triggered by an electronic control unit which is also set up to detect performance parameters of the vehicle, the electric motor and/or the vehicle brake. The invention further relates to an electrically actuatable vehicle brake, which is additionally fitted with a device for fixing the initial position of the brake piston, in which a predetermined, desired brake release play is kept constant.

Electrically actuatable vehicle brakes of this kind are known in various embodiments from the prior art. The forces occurring in these disc brakes as part of a braking process can be divided into clamping force (also called axial force, transverse force, brake application force or normal force) and peripheral force (also called frictional force).

The force component which is introduced into the brake disc by a brake shoe perpendicular to the plane of the brake disc is designated as clamping force. The peripheral force, on the other hand, is understood as the force component which acts on the brake shoe owing to the brake friction between a friction lining of the brake shoe and the brake disc in the peripheral direction of the brake disc. The braking moment can be estimated by multiplying the peripheral force by the distance of the point of application of the peripheral force from the axis of rotation of the wheels.

In a disc brake known from WO 99/05011, and corresponding U.S. Pat. No. 6,394,235, both of which are incorporated by reference herein, the clamping force is generated either hydraulically or by means of an electric motor. In the case of hydraulic generation of clamping force a hydraulic fluid, put under pressure, is introduced into a hydraulic chamber constructed in a housing of the disc brake. A hollow piston of an actuator device accommodated displaceably in the hydraulic chamber is moved by the hydraulic fluid in the direction of one of the two brake shoes and brings it into frictional engagement with the brake disc. As the disc brake is configured as a floating caliper disc brake, the brake shoe which is not directly cooperating with the piston is also abutted against the brake disc in a known manner.

Where the clamping force is generated by an electric motor the rotational movement of a motor shaft is first reduced by means of a planetary gear train and then converted into a translatory movement by means of a nut and spindle arrangement of the actuator device arranged inside the hollow piston. The hollow piston is grasped by this translatory movement and transmits the translatory movement to one of the two brake shoes, which is thereupon abutted against the brake disc. In this vehicle brake, when the brake is not actuated a nut of the nut and spindle arrangement acting on the brake piston in the case of brake actuation by electric motor is arranged at a defined distance from the brake piston positioned in its initial position. In order to guarantee optimum functioning of the vehicle brake, this distance should be set as accurately as possible, as too great a distance leads to lengthening of the response time of the brake, while if the distance is too small a residual slipping moment could arise between the rotating brake disc and the friction linings.

In all known electrically actuatable disc brakes the fundamental problem arises that the distance between the friction linings and the brake disc when the brake is not actuated, the so-called brake release play, increases as a result of wear of the friction linings, thereby lengthening the response time of the brake. There is a further problem with brake arrangements of the kind known from WO 99/05011, in which the initial position of the brake piston is fixed not with the aid of an element of the transmission unit acting on the piston, but by means of a separate device, that the defined distance between the component of the actuator device acting on the brake piston in the case of brake actuation by electric motor and the brake piston can become undesirably smaller or larger in the course of the operating life of the vehicle brake.

A method for controlling or regulating a brake is known from DE 197 30 094 A1 and corresponding U.S. Pat. No. 6,536,562, both of which are incorporated by reference herein, with a first friction surface electrically actuatable by means of an actuator and a second friction surface, between which a release play is provided. For this the position of the actuator and the current to be supplied to the actuator are detected and abutment of the first friction surface to the second is fixed and thereupon a contact signal generated.

In order to enable recognition and setting of the release play using actuator-specific parameters independently of a special brake actuation and also to enable re-setting of the release play while the vehicle is travelling, to fix the abutment the change in the actuator current and the change in the actuator position are evaluated.

From DE 198 35 550 A1 a motor vehicle disc brake device is known, with a brake housing, a brake piston axially movable hydraulically/mechanically in the brake housing and further with a hydraulic actuating device and with a mechanical actuating device with a rotatable spindle and a nut which is axially displaceable in respect of the spindle by rotation thereof. The brake piston can be impacted hydraulically by means of the hydraulic actuating device and/or mechanically by means of the mechanical actuating device. The brake piston is supported on the nut in the case of mechanical actuation.

In order to configure this arrangement as more independent of the effects of temperature and ageing, at least one sensor is provided in this motor vehicle disc brake device, wherein the mechanical actuating device correspondingly tracks the brake piston as a function of brake lining wear detected by the sensor and wherein the mechanical actuating device fixes the brake piston if an appropriate brake is established by hydraulic methods and detected by the sensor.

Underlying the present invention is the problem of increasing the operational safety of an electrically actuatable disc brake and in particular guaranteeing short response times of the brake in braking operation.

To solve this problem, according to the invention an electrically actuatable vehicle brake with the features cited in the independent device claims and a method for controlling an electrically actuatable vehicle brake according to the independent method claims is proposed.

The electrically actuatable vehicle brake comprises a brake piston, acting on at least one friction lining and displaceable out of an initial position into an actuation position in which the brake piston abuts the friction lining against a rotating member of the vehicle brake to be connected, fixed against rotation, to a wheel of the motor vehicle, and a transmission unit, driven by an electric motor and acting on the brake piston, to actuate the brake piston, wherein the electric motor is to be triggered by an electronic control unit which is also set up to detect performance parameters of the vehicle, the electric motor and/or the vehicle brake. The electronic control unit is set up and programmed to trigger the electric motor by means of a control and evaluation program running in it in such a way that the brake piston is displaced in response to the detecting of at least one predetermined operating condition in a first direction into its actuation position, in which the at least one friction lining abuts against the rotating member, and the brake piston is then displaced by a path corresponding to a predetermined, desired brake release play in a second direction, opposite the first direction, into its initial position.

By regularly carrying out a calibration of this kind of the brake arrangement according to the invention the wear of the friction linings can be reliably compensated for and the brake release play kept at a constant value. The frequency with which the calibration is carried out can be set as wished by suitable selection of the operating condition to be detected and depends, for example, on the demands made on the system by functions such as ABS, ASR, EPB, etc., for example:

If the vehicle brake according to the invention additionally comprises a device for fixing the initial position of the brake piston, which fixes the initial position of the brake piston in such a way that a predetermined brake release play is kept constant during the operating life of the brake, the electronic control unit is set up and programmed by means of a control and evaluation program running in it to trigger the electric motor in such a way that, in response to the detecting of at least one predetermined operating condition, an element of the transmission unit acting on the brake piston where there is electric actuation of the brake is displaced in a first direction into its actuation position, in which the brake piston actuated by the element abuts the at least one friction lining against the rotating member. The element is then displaced in a second direction opposite the first direction, into its initial position, by a path corresponding to the predetermined brake release play and, if wished, a predetermined distance between the element and the brake piston when the brake is not actuated.

If the initial position of the brake piston in an electrically actuated brake of this kind, which can be configured, for example, in such a way that the brake piston can be actuated both hydraulically and by electric motor, is established by a separate device, with the aid of calibration of this kind the distance existing when the brake is not actuated between the element of the transmission unit acting on the brake piston in the case of electric brake actuation and the brake piston can be kept at the desired value.

Modern motor vehicles are fitted with a bus system (CAN, for example), to provide estimated performance parameters of components or modules of the motor vehicle to the control units present in the vehicle or to communicate trigger signals from the control units to components or modules of the vehicle. Therefore performance parameters of the vehicle, the electric motor and/or the vehicle brake (for example, operating state of the vehicle, current consumption of the electric motor and braking force exerted by the vehicle brake) are usually detected and evaluated for other purposes in any case. Thus no further outlay on components, circuitry, etc. arises for detecting the predetermined operating condition or for detecting the actuation position of the brake piston. Thus the increased operational safety resulting from the invention and the short response time of the braking system can be provided with the smallest additional outlay. However, if the performance parameters of the vehicle, the electric motor and/or the vehicle brake required for the calibration of the braking system are not available in the bus system, it is necessary to supply these data to the electronic control unit (ECU) in some other way (by suitable sensors).

In a particularly preferred embodiment of the electrically actuatable vehicle brake without the device for fixing the initial position of the brake piston the electronic control unit is set up to trigger the electric motor in such a way that the brake piston is displaced into a predetermined zero position before being displaced into its actuation position. Moreover, the electronic control unit is set up to detect a dimension which is correlated to a path covered by the brake piston between its zero position and its actuation position and to compare the detected dimension with a stored reference dimension, the reference dimension being correlated to a path covered by the brake piston in a vehicle brake fitted with new friction linings.

Because of the wear of the friction linings and the resulting enlargement of the brake release play the path to be covered by the brake piston from the zero position to the actuation position lengthens in comparison to a path covered by the brake piston in a vehicle brake with new, unworn brake linings. The comparison between the detected dimension, which is correlated to the path covered by the brake piston, and the reference dimension, which is correlated to the path covered by the brake piston in a vehicle brake fitted with new friction linings, therefore enables determination of the overall wear of the friction linings. To carry out the above-described functions the electronic control unit may have a computer unit equipped with a memory, which calculates from the detected dimension and the reference dimension stored in the memory a difference corresponding to the wear of the friction linings. A suitable dimension correlated to the path covered by the brake piston is, for example, the number of steps of the electric motor. The brake arrangement according to the invention therefore preferably comprises a sensor, which detects the steps of the electric motor. The value output by the sensor can then be set at zero in the electronic control unit when the brake piston is in its zero position.

The electronic control unit is preferably set up to issue a warning signal to the vehicle driver if a difference between the detected dimension and the reference dimension exceeds a predetermined value. Additionally or instead of this a quantitative indication (for example, by means of a bar display) of the thickness of the brake lining can also be given to the driver. The predetermined value may, for example, correspond to a critical wear value of the friction linings at which a change of friction linings should be made. The signal issued to the driver may be an acoustic or optical signal, issued, for example, at the start of a journey when the ignition is switched on.

In a similar way the electronic control unit in the vehicle brake fitted with the device for fixing the initial position of the brake piston can be set up to trigger the electric motor in such a way that the element of the transmission unit acting on the brake piston is displaced into a predetermined zero position before being displaced into its actuation position. The electronic control unit is then further set up to detect a dimension which is correlated to a path covered by the element between its zero position and its actuation position and to compare the detected dimension with a stored reference dimension, the reference dimension being correlated to a path covered by the element in a vehicle brake fitted with new friction linings.

Like the path of the brake piston, the path covered by the element acting on the brake piston from the zero position to the actuation position also lengthens as a function of the wear of the friction linings. If the initial position of the brake piston is fixed by a separate device, for example a "rollback" seal cooperating with the brake piston, a comparison of the measured dimension correlated to the path covered by the element with a reference dimension which is correlated to the path covered by the element in a vehicle brake fitted with new friction linings can also be drawn on to determine the overall wear of the friction linings. The electronic control unit then preferably has a computer unit equipped with a memory, to calculate a difference, corresponding to the wear of the friction linings, between the detected dimension and the reference dimension stored in the memory. A suitable dimension correlated to the path covered by the element is, for example, the number of steps-of the electric motor. Therefore there is preferably a sensor which detects the steps of the electric motor. The value output by the sensor can then be set at zero in the electronic control unit when the element acting on the brake piston is in its zero position.

The effect caused by the "rollback seal" and the configuration of a seal of this kind leading to it is described in DE 196 47 434 A1, and corresponding U.S. Pat. Nos. 6,164,422 and 6,439,351, all of which are incorporated by reference herein, for example. On braking the piston moves by hydraulic pressure in the direction of the brake disc and the elastomer sealing ring is slightly entrained by the displacing piston and thereby also slightly deformed by the hydraulic pressure.

When the pressure on the brake is relieved, i.e. when the hydraulic pressure ceases, the deformed elastomer sealing ring exerts a restoring force on the piston and entrains it a small amount in the direction away from the brake disc. This behaviour is totally desirable, because it resets the brake piston and ensures that the so-called brake release play sets in between the friction lining and the brake disc after braking has ended. Reference is made on this to German patent specification 1 600 008, and corresponding U.S. Pat. No. 3,421,604, both of which are incorporated by reference herein, in which this behaviour is described in detail. To support the previously described behaviour of the sealing ring, which is preferably made of an elastomer, even the side wall on the brake lining side of the groove in which the sealing ring is held is frequently chamfered, i.e. the groove cross-section widens from the bottom of the groove outwards (see on this FR PS 1 504 679, and corresponding U.S. Pat. No. 3,377,076, both of which are incorporated by reference herein).

A certain adhesion between the Cooperating surfaces of the sealing ring and the brake piston is required for the sealing ring to be able to reset the brake piston. If the sliding properties between these surfaces were to be too good this would prevent re-setting of the piston, as the latter would be displaced by sliding relative to the sealing ring virtually immediately, which would mean there would be no longer be any deformation of the sealing ring and therefore no restoring force either.

On the other hand, under certain circumstances sliding of the brake piston relative to the sealing ring is very desirable. This is the case, for example, when the brake is being assembled. Here the brake piston has to be pushed into the cylinder after the sealing ring has been placed into the groove accommodating it in the cylinder wall. If the piston and the sealing ring were not able to slide relative to one another, it would be very probable that the sealing ring would twist in the groove or would be damaged and partially sheared off.

Sliding of the brake piston relative to the sealing ring is also necessary, however, in certain operating states of the brake, for example if the thickness of the friction lining is reduced by wear, so the brake piston has to be displaced correspondingly further in the direction of the brake disc to abut the friction lining against the brake disc. Under such circumstances the deformability of the elastomer sealing ring is exceeded and the piston has to slide relative to the sealing ring to adopt a new position relative to the sealing ring.

Sliding of the brake piston relative to the sealing ring may also become necessary with very strong braking operations, as, owing to the large forces, the brake housing then widens out, the material of the friction lining is compressed, etc., so a correspondingly larger displacement path of the brake piston has to be produced.

The electronic control unit can, moreover, be set up to issue a warning signal to the vehicle driver if a difference between the detected dimension correlated to the path covered by the element from the zero position to the actuation position and the stored reference dimension correlated to the path covered by the element in a vehicle brake fitted with new friction linings exceeds a predetermined value. The predetermined value preferably corresponds to a critical wear value of the friction linings at which a change of friction linings should take place.

SUMMARY OF THE INVENTION

In a preferred embodiment of the invention the predetermined operating condition is met if the vehicle has covered a predetermined distance since the last calibration of the brake. A suitable distance could be 500 km, for example. This guarantees in a simple manner that the braking system is regularly calibrated.

Alternatively, the predetermined operating condition can be met if a dimension correlated to a clamping force gradient exceeds a predetermined critical value. The gradient of a clamping force/time characteristic curve (clamping force gradient) after abutment of the friction linings against the brake disc can serve as a measurement for the state of the friction linings, as new, unworn friction linings are more elastic and therefore more compressible than old, already worn friction linings. This means that the build up of clamping force takes place in new friction linings more slowly than in old friction linings, so an increase in the clamping force gradient can be judged as an indication of increasing wear of the friction linings. In this embodiment of the invention calibration of the brake consequently always takes place when a dimension correlated to the clamping force gradient exceeds a critical value, which on its part is a measurement for a defined friction lining wear. A suitable dimension correlated to the clamping force gradient may be the clamping force gradient itself or the gradient of a current consumption/time characteristic curve of the electric motor (current consumption gradient) after abutment of the friction linings against the brake disc.

Calibration of the vehicle brake according to the invention can take place on the basis of the detecting of only one of the two above-mentioned operating conditions. However, it is also possible to detect the performance parameters on which the two operating conditions are based continuously and always to carry out calibration of the brake if one of the conditions or both conditions are met.

Calibration of the vehicle brake according to the invention preferably takes place only when the ignition of the vehicle is switched off, when the vehicle is stationary and/or when the vehicle is on the flat and/or when the brake is not or has not yet been applied. This avoids undesirable operating states of the vehicle caused by the calibration process.

The electronic control unit can be set up to detect a dimension correlated to a clamping force and also a characteristic dimension for actuation of the electric motor by appropriate transducers while the brake piston is being displaced into its actuation position, in which the brake piston abuts at least one friction lining against the rotating member, from this to estimate the actuation position of the brake piston in which the friction lining abuts against the rotating member of the vehicle brake and to use this estimated actuation position as a basis for the displacements of the brake piston and/or the element of the transmission unit acting on the brake piston. In a configuration of this kind of the braking arrangement according to the invention the actuation position of the brake piston can be particularly accurately estimated and thus the desired brake release play or the desired distance between the element acting on the brake piston and the brake piston can be exactly set.

In a preferred embodiment of the invention the electronic control unit is set up and programmed to determine an approximation function from the pairs of values of the detected clamping force and the associated dimension characteristic of the actuation of the electric motor by means of a method of approximation. For this purpose the electronic control unit may comprise a computer unit equipped with a memory for filing the estimated actuation position.

The electronic control unit can further be set up and programmed to estimate a polynomial approximation function of at least the second order from at least three pairs of values by the method of approximation. A great variety of methods can be used as methods of approximation: Newton's method of approximation, Lagrange method, etc. Alternatively, the three parameters of the approximation function of the second order can also be determined by means of a linear equation system which is solved, for example, by the Gauss algorithm.

The electronic control unit is preferably also set up and programmed to determine in a further step, starting from the estimated approximation function, a zero position of the polynomial approximation function with positive gradient or, if a zero position with positive gradient cannot be determined, the minimum of the polynomial approximation function, as actuation position of the brake piston at which the friction lining abuts against the rotating member of the vehicle brake.

The dimensions characteristic of actuation of the electric motor, according to the invention can comprise the current consumption, but also path or angle steps of the electric motor.

The dimension correlated to the clamping force can comprise the clamping force itself, the peripheral force, the braking moment or the frictional force exerted on the carriageway by the wheel.

As a result of the restoring forces being released on release of the brake and owing to the elasticity of the friction linings, a clamping force/motor step characteristic curve when the brake is released is moved laterally to the left in comparison to a clamping force/motor step characteristic curve when the brake is applied, i.e. a brake application process runs along a right branch of a curve, whereas the release process follows a left branch of a curve.

To take account of this displacement of the characteristic curve or the actuation position resulting from this hysteresis behaviour, the actuation position of the brake piston in which the brake linings have overcome the brake release play and (just) abut against the brake disc can be estimated from both the ascending and the negative slope of the clamping force/motor step characteristic curve. A mean value, for example, can then be formed from these two values.

The method according to the invention for controlling an electrically actuatable vehicle brake comprises determining a desired brake release play and detecting at least one predetermined operating condition. In response to the detecting of the at least one predetermined operating condition the brake piston is displaced in a first direction into its actuation position in which the at least one friction lining abuts against the rotating member. The brake piston is then displaced back into its initial position in a second direction opposite the first direction by a path corresponding to the predetermined, desired brake release play.

In the control method according to the invention the brake piston is preferably displaced into a predetermined zero position before being displaced into its actuation position and a dimension is detected which is correlated to the path covered by the brake piston between its zero position and its actuation position. The detected dimension is then compared with a stored reference dimension, which is correlated to a path covered by the brake piston in a vehicle brake fitted with new friction linings.

In a particularly preferred embodiment of the control method according to the invention a warning signal is issued to the vehicle driver if a difference between this detected dimension and the reference dimension exceeds a predetermined value.

In a similar way the method according to the invention for controlling a vehicle brake equipped with a device for fixing the initial position of the brake piston comprises determining a desired distance between the element of the transmission unit acting on the brake piston and the brake piston when the brake is not actuated and detecting at least one predetermined operating condition. In response to the detecting of the at least one predetermined operating condition the element of the transmission unit acting on the brake piston is displaced in a first direction into its actuation position in which the brake piston actuated by the element abuts the at least one friction lining against the rotating member. The element is then displaced back into its initial position in a second direction opposite the first direction by a path corresponding to a sum made up of the predetermined, desired brake release play and the predetermined, desired distance between the element and the brake piston when the brake is not actuated.

In the control method according to the invention the element of the transmission unit acting on the brake piston is preferably displaced into a predetermined zero position before being displaced into its actuation position and a dimension which is correlated to the path covered by the element between its zero position and its actuation position is detected. The detected dimension is then compared with a stored reference dimension which is correlated to a path covered by the element in a vehicle brake fitted with new friction linings.

In a particularly preferred embodiment of the control method according to the invention a warning signal is issued to the vehicle driver if a difference between this detected dimension and the reference dimension exceeds a predetermined value.

Other advantages of this invention will become apparent to those skilled in the art from the following detailed description of the preferred embodiment, when read in light of the accompanying drawings.

BRIEF DESCRIPTION OF THE DRAWINGS

FIG. 7 is illustrated.

FIG. 7 is illustrated.

FIG. 7 is illustrated.

DETAILED DESCRIPTION OF THE INVENTION

Figure 1:
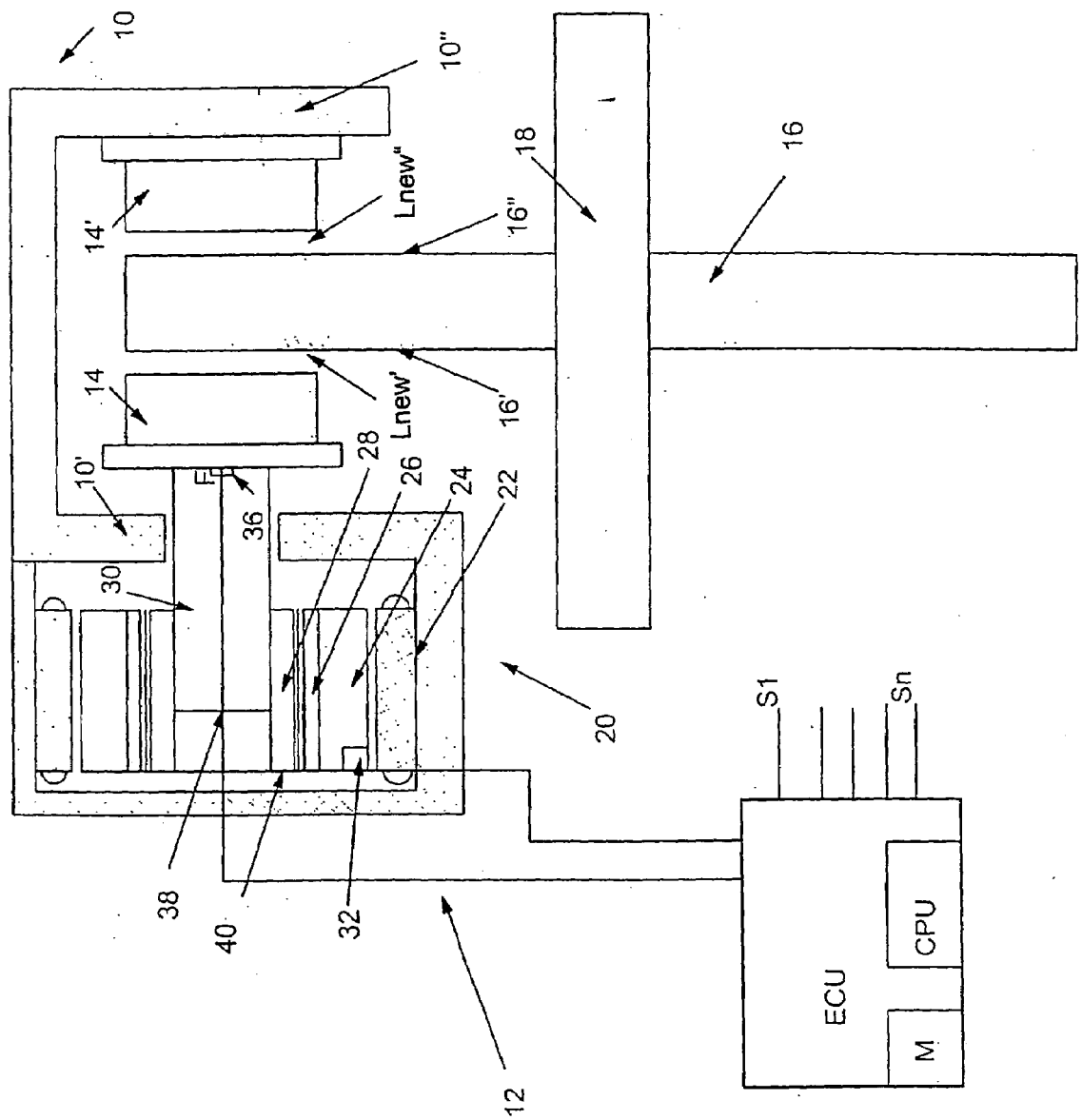
FIG. 1 shows a schematic illustration of a first electrically actuatable motor vehicle disc brake with new friction linings in longitudinal section.

FIG. 1 shows an electrically actuatable motor vehicle disc brake having a caliper 10, substantially U-shaped in longitudinal section, and an electric actuation unit 12 arranged on the caliper 10. In the caliper 10, on its two legs 10', 10" are arranged two friction linings 14, 14' (accommodated in guides not further depicted). The two friction linings 14, 14' are arranged on both sides of a brake disc 16 overlapped by the caliper 10 and cooperate in each case with one side face 16', 16" of the brake disc 16, which is connected, fixed against rotation to a bearing journal 18 of the motor vehicle, shown only partially. The friction linings 14, 14' are arranged in the caliper 10 as displaceable towards or away from the brake disc 16. In the embodiment shown this is a floating caliper arrangement in which one of the friction linings 14 can be brought into friction engagement with the brake disc 16 directly by the actuating unit 12 and the other friction lining 14' by the action of a power of recoil exerted by the caliper 10.

The actuating unit 12 is placed against the caliper 10 laterally and has an electric motor 20 which in the embodiment shown is an interior running motor with a stator 22 rigidly mounted on the housing and a rotor 24 circulating therein. Inside the rotor 24 is arranged an inner set of teeth 26 which can transmit a rotation of the rotor 24 to a ring 28 with an outer set of teeth, which is arranged as fixed against rotation but axially displaceable on a brake piston 30, which projects through the electric motor 20 as far as the friction lining 14. This transmission 26, 28 operating in the manner of a nut/spindle arrangement has a relatively high reduction and serves to convert the rotational movement of the electric motor 20 into a longitudinal movement of the brake piston 30.

The electric motor 20 is connected via appropriate lines to an electronic control unit ECU, equipped with a computer unit CPU and a memory M, for generating the trigger signals of the electric motor 20. Signals representative of operating states of the motor vehicle are sent to the electronic control unit ECU from sensors S1 . . . Sn present in the motor vehicle. In the electric motor 20 there is also a sensor 32, which detects the steps of the electric motor 20 and communicates an appropriate signal to the electronic control unit ECU.

A signal F, reproducing the clamping force, is generated by a force sensor 36 arranged between the brake piston 30 and the friction lining 14 and conducted to the electronic control unit ECU. In the electronic control unit ECU a clamping force/time characteristic curve (F/t characteristic curve) can be estimated from the signals communicated by the force sensor 36 and from this a clamping force gradient $dF/dt$. As the electronic control unit ECU supplies the trigger current for the electric motor 20, it is, moreover, easily possible to determine in the electronic control unit ECU the functional interrelationship between the clamping force F exerted by the vehicle brake and the current used for this or the motor steps of the electric motor 20 carried out within a braking cycle (applying the brake linings 14, 14' to the brake disc 16 and subsequent release of the brake linings 14, 14' from the brake disc 16).

Figure 2:
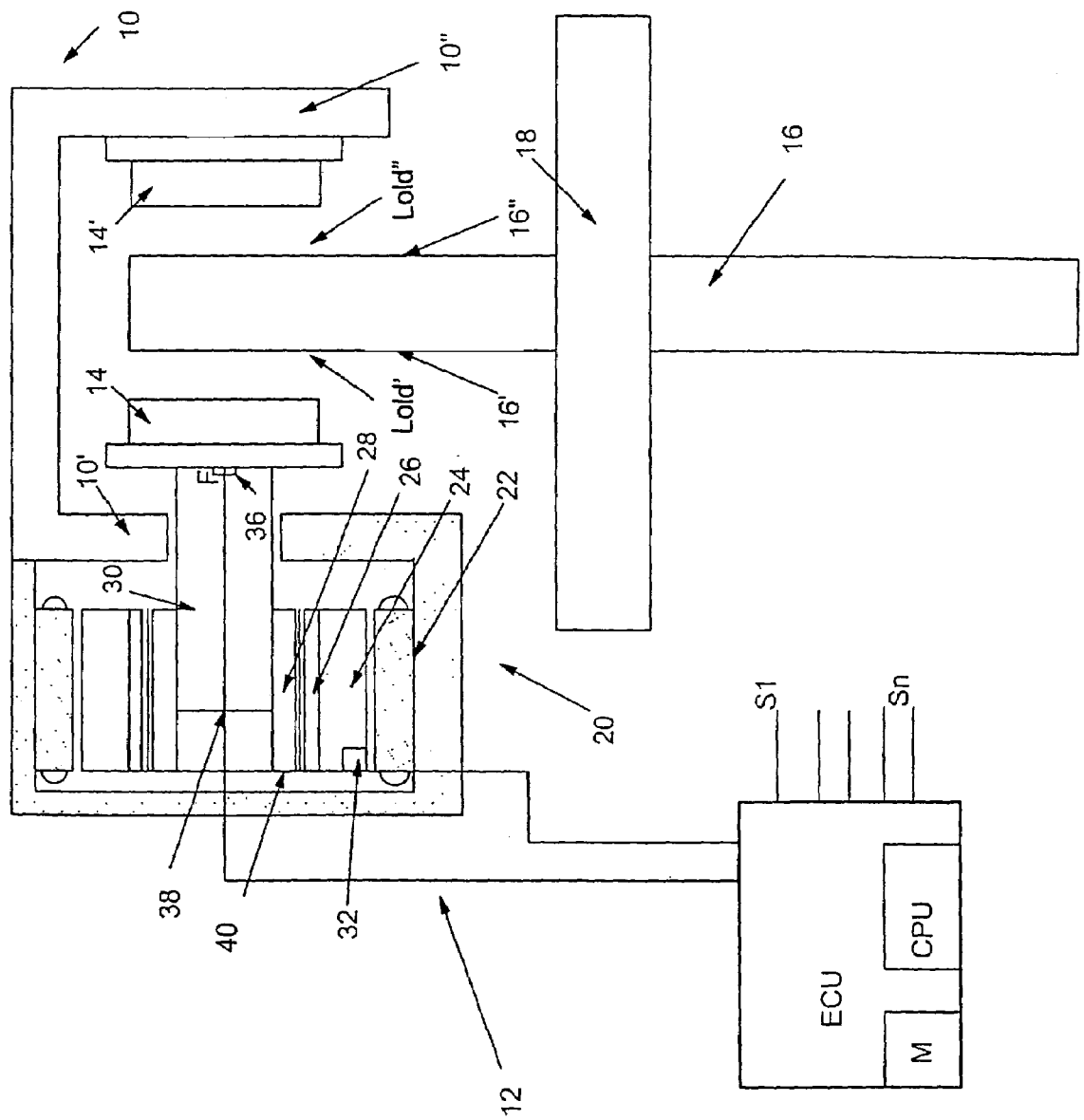
FIG. 2 shows a schematic illustration of the first electrically actuatable motor vehicle disc brake with worn friction linings in longitudinal section.

The brake release play $L_{new}$ in a brake arrangement shown in FIG. 1 and fitted with new brake linings 14, 14' arises from the sum of the distances $L_{new}'$ between the first friction lining 14 and the side face 16' of the brake disc 16 and $L_{new}''$ between the second friction lining 14' and the side face 16" of the brake disc 16. As can be seen in FIG. 2, the brake release play enlarges as a result of the wear of the friction linings in a brake fitted with old, worn friction linings 14, 14' to a value $L_{old}$, which in turn arises from the sum of the distances $L_{old}'$ between the first friction lining 14 and the side face 16' of the brake disc 16 and $L_{old}''$ between the second friction lining 14' and the side face 16" of the brake disc 16.

With reference to the flow chart illustrated in FIG. 3, the sequence of a calibration method for re-adjusting the brake release play $L_{old}$ enlarged by the wear of the friction linings and for detecting the wear of the friction linings is described below.

In a first step determining the desired brake release play $L_{new}$ takes place first, before detecting a first or a second operating condition is required in a next step. The first operating condition is met if the vehicle has covered a distance of 500 km since the last calibration of the brake. The second operating condition is met if the clamping force gradient dF/dt exceeds a value $dF/dt_{crit}$ stored in the memory M of the electronic control unit ECU. In the embodiment example shown the method is always continued if either the first or the second operating condition is met.

Before the start of the calibration steps, detecting a series of further operating conditions is required in a subsequent method step. Continuation of the method takes place only if the ignition of the vehicle is switched off, if the vehicle is stationary and if the vehicle is on the flat. The performance parameters of the vehicle required for scanning the operating conditions are supplied to the electronic control unit ECU by the sensors S1 . . . Sn.

If all the required operating conditions are met, the electric motor 20 is triggered by the electronic control unit ECU in such a way that the brake piston 30 is displaced to the left in FIG. 2 into a zero position until a front face 38 of the brake piston 30 is flush with a front face 40 of the ring 28. When the brake piston 30 has reached the zero position, the signal communicated by the sensor 32 to detect the motor steps is set to the value zero in the electronic control unit ECU.

Then the brake piston 30 is displaced to the right in FIG. 2 into an actuation position, in which the friction linings 14, 14' have overcome the brake release play $L_{old}$ and (just) abut against the brake disc 16. Determining this actuation position is explained in greater detail below.

Figure 4:
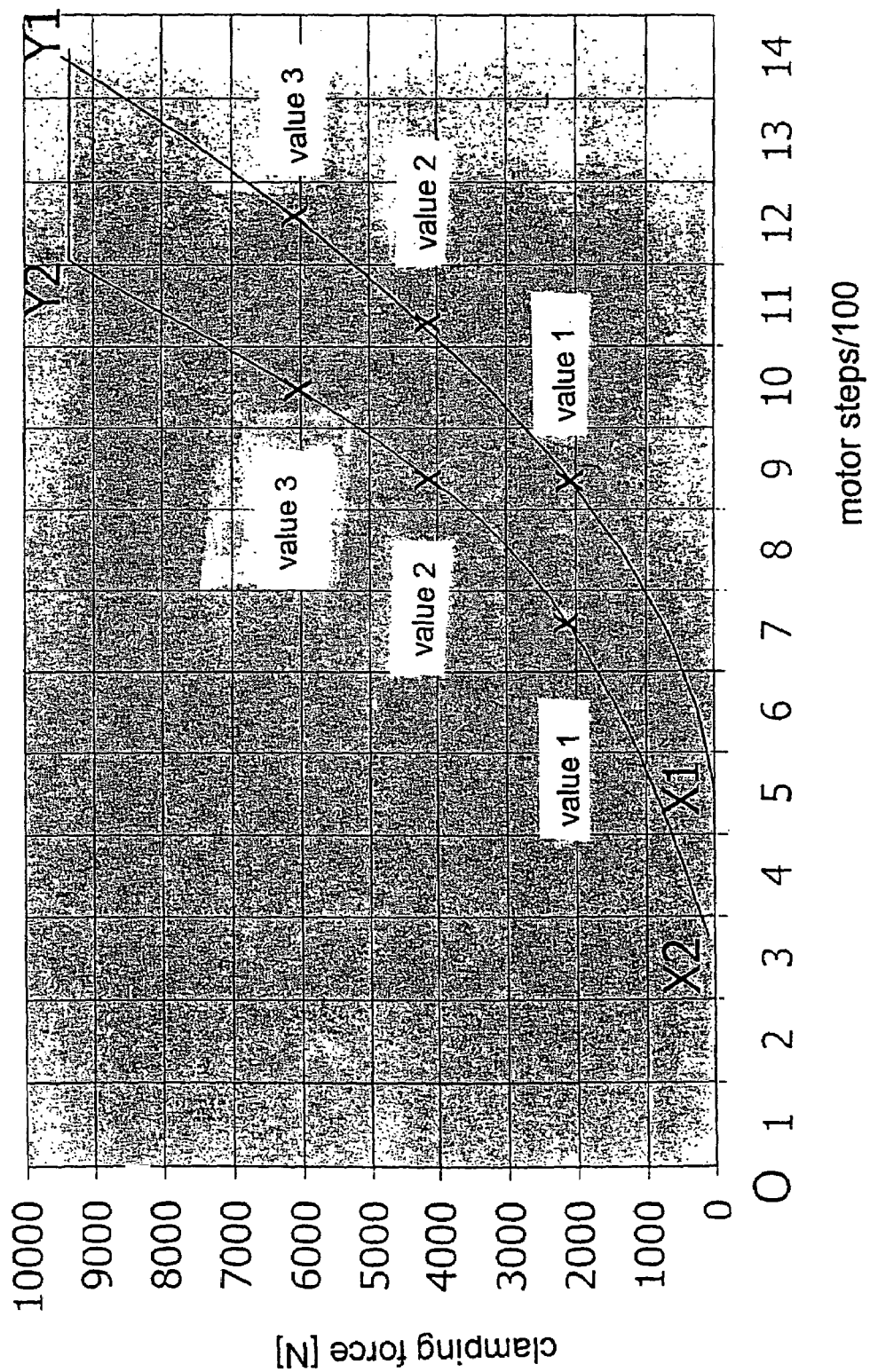
FIG. 4 shows a clamping force/motor step characteristic curve of a motor vehicle disc brake according to the invention.

The functional interrelationship between the clamping force F exerted by the vehicle brake and the current used for this or the motor steps of the electric motor 20 executed when the friction linings 14, 14' are applied to the brake disc 16 is depicted in FIG. 4. The clamping force/motor step characteristic curve begins at origin "O". Starting from origin "O", the electric motor 20 executes motor steps until the friction linings 14, 14' abut against the brake disc 16. At point "X1" the friction linings 14, 14' have overcome the brake release play and abut against the brake disc 16. From point "X1" onwards the clamping force F increases with further motor steps until the maximum brake application force is reached at point "Y1".

For a reliable calibration process it is an essential precondition to know the exact value of point "X1", at which the friction linings 14, 14' have overcome the brake release play and abut against the brake disc 16. However, as force sensors used for measuring the clamping forces have to cover a very large measuring range, reasonably priced force sensors, at least, are usually very insensitive to low force values. Therefore it is possible to estimate point "X1" directly by means of the force sensor 36 only with difficulty. Measurements have shown that the clamping force/motor step characteristic curve or clamping force/current consumption characteristic curve has a substantially parabolic shape ($y=ax^2+bx+c$; equation 1).

In order to estimate point "X1" more accurately, as would be possible with a direct force measurement, the circumstance that the force sensors provide more accurate results at higher force values is exploited. To estimate point "X1" the electric motor 20 is therefore supplied with current in such a way that the brake piston 30 abuts the brake linings 14, 14' against the brake disc 16 and exerts an ascending clamping force.

With several, more accurately with three previously estimated force values detected by the force sensor 36 (2 kilo Newton, 4 kilo Newton and 6 kilo Newton) the associated motor steps (or the period of motor activity) are detected and stored. Then by means of a method of approximation (for example, Lagrange interpolation) the parameters a, b and c of the above equation 1 are determined from these three pairs of values ($x_1$, $y_1$; $x_2$, $y_2$; $x_3$, $y_3$). This can also be done by the Gauss algorithm, in which the three pairs of values are inserted into the following equation system to be solved (equation 2):

$$ax_1^2+bx_1+c=y_1$$

$$ax_2^2+bx_2+c=y_2$$

$$ax_3^2+bx_3+c=y_3$$

Based on these three parameters, in a further processing section the zero points of the function can then be determined by the electronic control unit (ECU) ($x_{1/2}=(-b \pm (b^2-4ac)^2)^{1/2}/2a$; equation 3). From these two zero positions the one designating the zero passage of the ascending parabola branch is then estimated (as the parameter a is positive, it is the zero passage with the larger value, in other words the zero passage located further to the right on the X-axis). This point is stored as point "X1".

In order to take into account the displacement of the characteristic curve or the actuation position resulting from the hysteresis behaviour as a result of the restoring forces being released when the brake is released and the elasticity of the friction linings 14, 14', starting from a position Y1, at which the friction linings 14, 14' stop the brake disc 16 of the brake, the current supply to the electric motor 20 is withdrawn to such an extent that the clamping force F is reduced or a clamping force course with negative slope to point X2 arises. In the same way as with the ascending clamping force course, the motor steps appropriate to predetermined force values are also detected and stored with the negative slope clamping force course.

From the two points X1 and X2 a common mean value can be formed which is stored as actuation position of the brake piston 30 and used as a basis for the further calibration process.

By means of the sensor 32 the number of motor steps S required to displace the brake piston 30 from its zero position into its actuation position can then be detected and communicated to the electronic control unit ECU. The electronic control unit ECU then compares the value S of the number of motor steps detected by the sensor 32 with a reference value $S_{new}$ filed in the memory M, corresponding to a value in a brake fitted with new friction linings 14, 14'. The difference ΔS between the measured value S and the stored reference value $S_{new}$ represents a measurement for the wear of the friction linings 14, 14'.

The electronic control unit ECU-subsequently compares the value ΔS with a value $S_{crit}$, likewise filed in the memory M, and issues a warning signal to the driver if the value ΔS exceeds the stored value $S_{crit}$. The value $S_{crit}$ represents a critical wear value of the friction linings 14, 14' at which a change of friction linings 14, 14' should take place.

In a last step the brake piston 30 is displaced to the left in FIG. 2 out of the actuation position into an initial position. The path therein covered by the brake piston 30 corresponds to the brake release play $L_{new}$ in the brake provided with new friction linings 14, 14'. Calibration of the brake is therefore complete.

Figure 5:
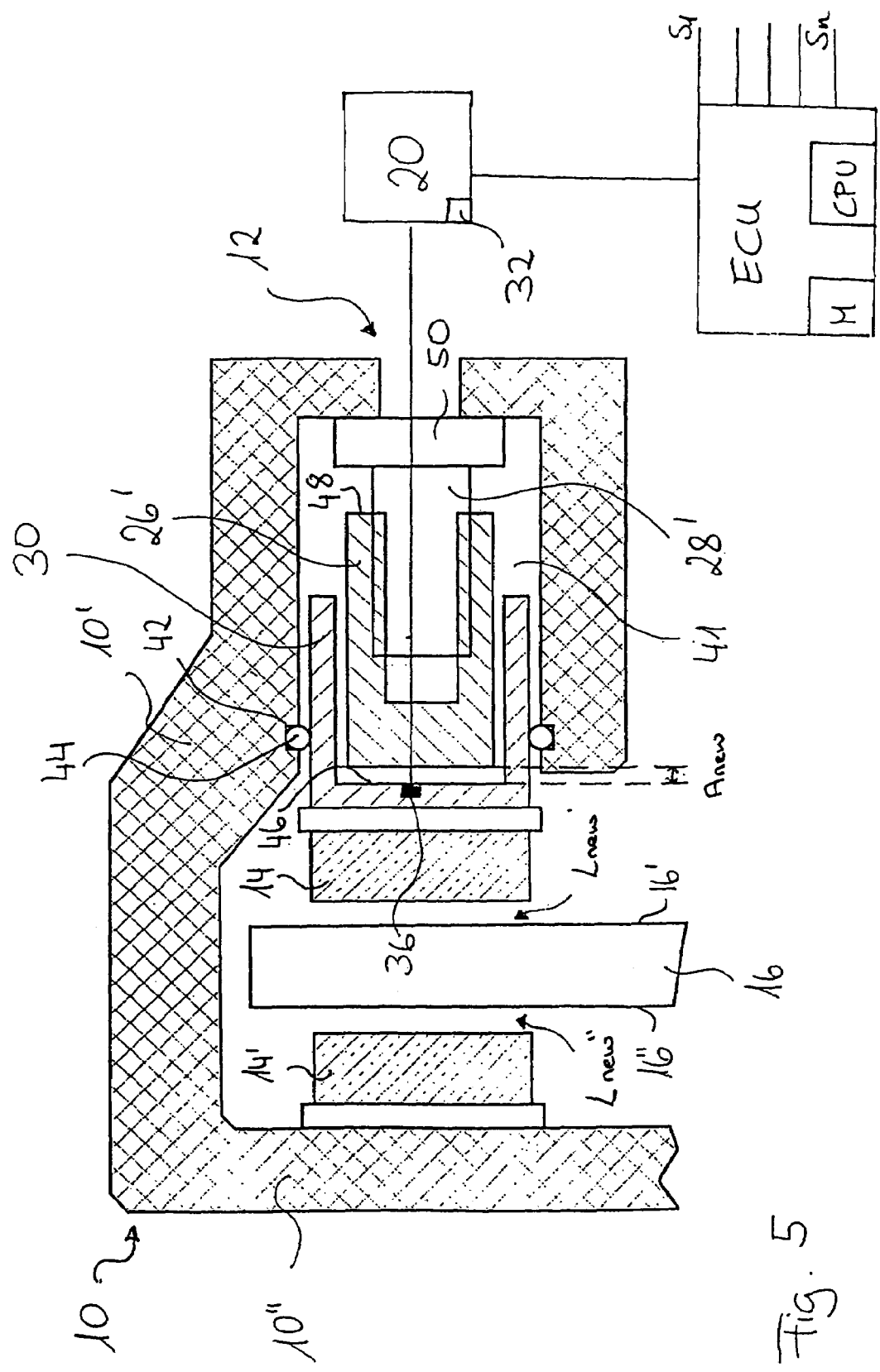
FIG. 5 shows a schematic illustration of a further electrically actuatable motor vehicle disc brake with new friction linings in longitudinal section.

FIG. 5 shows a further electrically actuatable motor vehicle disc brake with a caliper 10, substantially U-shaped in cross-section, a brake piston 30 embodied as a hollow piston and an electric actuation unit 12. Like the arrangement shown in FIGS. 1 and 2, this disc brake is also constructed as a floating caliper arrangement, so one of the friction linings 14 can be brought into frictional engagement with the brake disc 16 directly by the brake piston 30 and the other friction lining 14' by the action of the power of recoil exerted by the caliper 10. The actuating unit 12 has an electric motor 20, not depicted in greater detail, and a gear transmission 26', 28' operating in the manner of a nut/spindle arrangement. Moreover, the brake piston 30 is actuatable by means of a hydraulic pressure which can be introduced into a hydraulic chamber 41 from a hydraulic fluid tank, not shown. The disc brake shown is thus actuatable both hydraulically and by electric motor.

In a groove 42 constructed in the caliper 10 is arranged a "rollback" seal 44 which fixes the initial position of the brake piston 30 in such a way that the brake release play is kept at a constant value irrespective of the wear of the friction linings. Accordingly, brake release play $L_{old}$ in a brake shown in FIG. 6 and fitted with worn friction linings 14, 14' is exactly the same size as the brake release play $L_{new}$ in the brake shown in FIG. 5 provided with new friction linings 14, 14'. However, by the displacement of the initial position of the brake piston 30 to compensate for the wear of the friction linings, a distance existing between the nut 26' of the nut/spindle arrangement 26', 28' acting on the brake piston 30 and the bottom 46 of the brake piston 30 when the brake is not actuated enlarges from a value $A_{new}$ in a brake provided with new friction linings 14, 14' to a value $A_{old}$ in a brake fitted with worn friction linings 14, 14'.

With reference to the flow chart illustrated in FIG. 7, the sequence of a calibration method for readjusting the distance $A_{old}$ between the nut 26' and the bottom 46 of the piston, enlarged by the wear of the friction linings, and for estimating the wear of the friction linings is described below.

Figure 3:
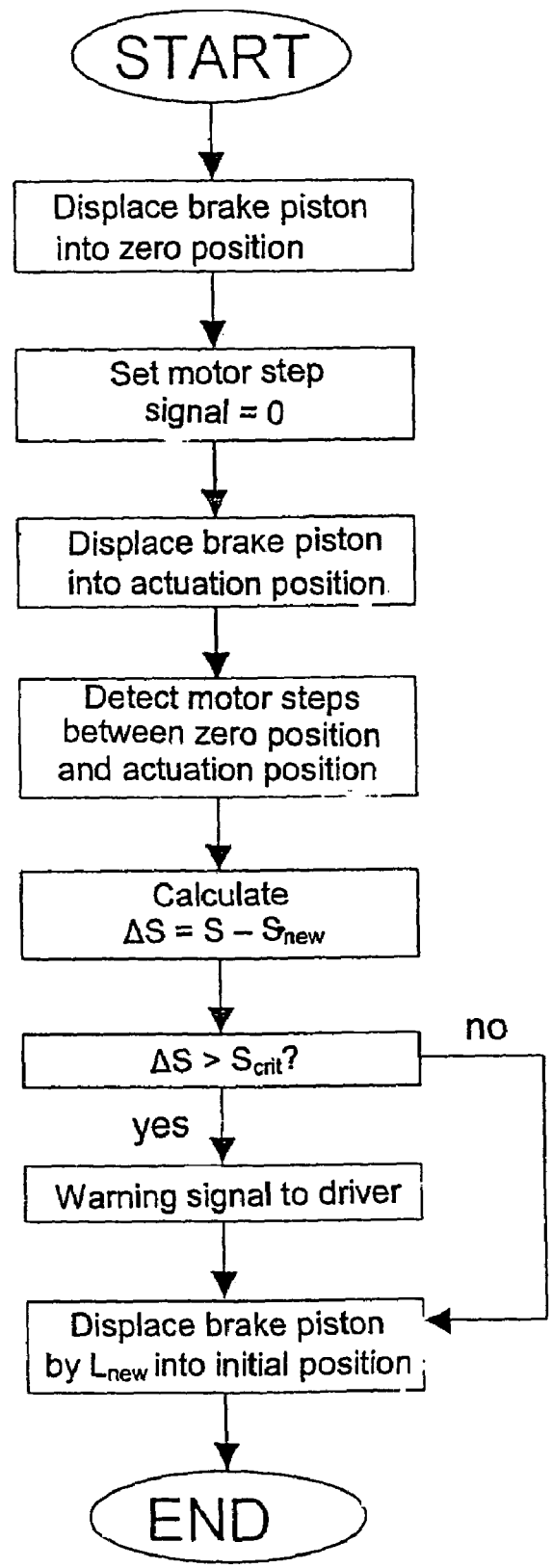
FIG. 3 shows a flow chart in which the sequence of a method for controlling the disc brake shown in FIGS. 1 and 2 is illustrated.

In a first step determining the desired distance $A_{new}$ first takes place before, as already explained in the calibration method described in conjunction with FIG. 3, detecting of a first or a second operating condition is required. The first operating condition is met if the vehicle has covered a distance of 500 km since the last calibration of the brake. The second operating condition is met if the clamping force gradient dF/dt exceeds a value $dF/dt_{crit}$ stored in the memory M of the electronic control unit ECU.

Before the start of the calibration steps, in a subsequent method step detecting of a series of further operating conditions is required. Continuation of the method takes place only if the ignition of the vehicle is switched off, if the vehicle is stationary and if the vehicle is on the flat. The performance parameters of the vehicle required for scanning the operating conditions are in turn supplied to the electronic control unit ECU by the sensors S1 . . . Sn.

Figure 6:
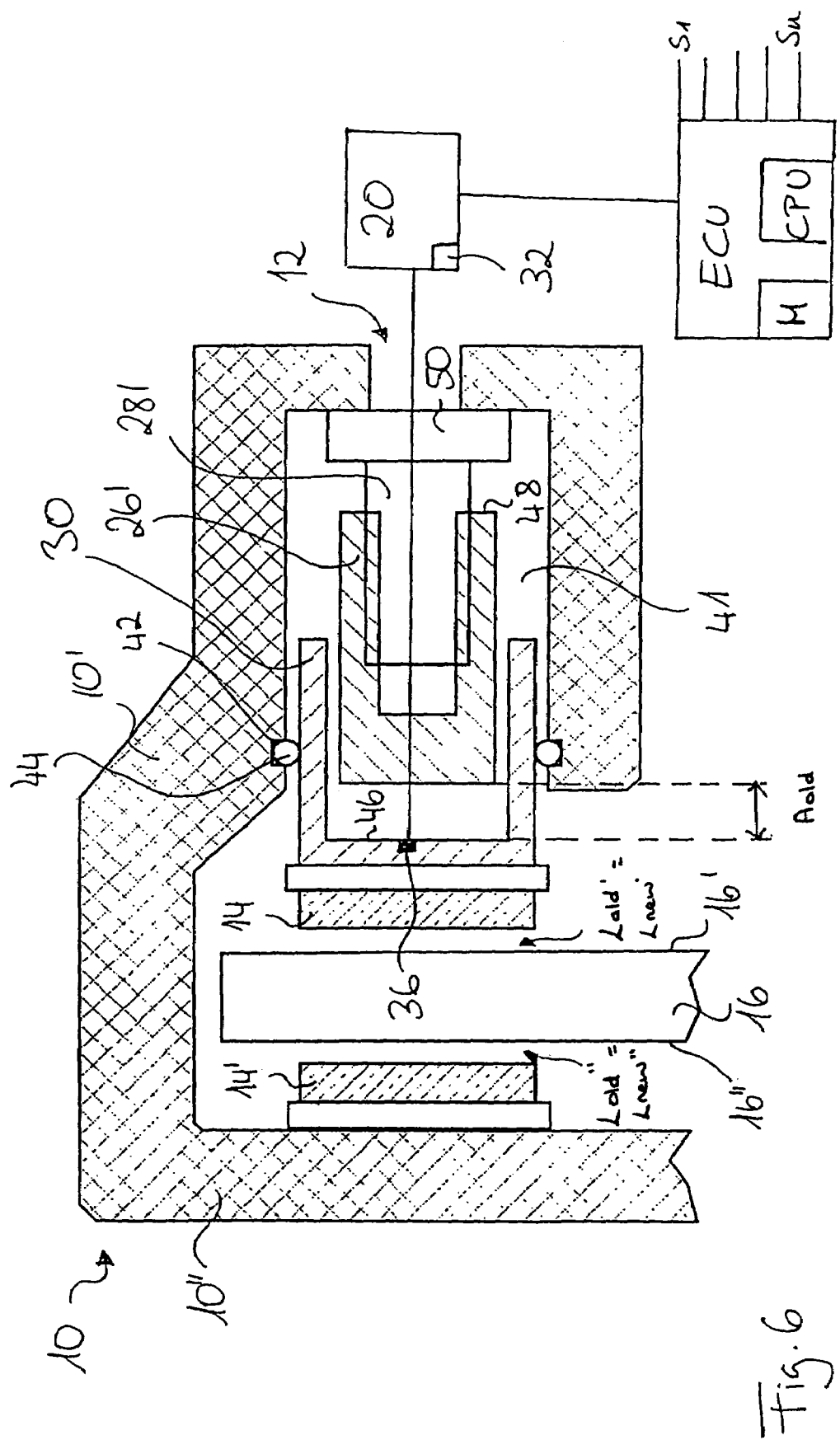
FIG. 6 shows a schematic illustration of the further electrically actuatable motor vehicle disc brake with worn friction linings in longitudinal section.

If all the necessary operating conditions are met, the electric motor 20 is triggered by the electronic control unit ECU in such a way that the nut 26' of the nut/spindle arrangement 26', 28' is displaced to the right in FIG. 6 into a zero position, until a front face 48 of the nut 26' comes into abutment with a limit stop 50. When the nut 26' has reached the zero position the signal communicated by the sensor 32 for detecting the steps of the electric motor 20 is set at the value zero in the electronic control unit ECU.

The nut 26' is then displaced to the left in FIG. 6 into an actuation position in which the brake piston 30 actuated by the nut 26' (just) abuts the friction linings 14, 14' against the brake disc 16. Determining this actuation position of the brake piston 30 is done as already described in conjunction with FIGS. 3 and 4.

By means of the sensor 32 the number of motor steps S' required to displace the nut 26' from its zero position into its actuation position can be detected and communicated to the electronic control unit ECU. Then the electronic control unit ECU compares the value S' of the number of motor steps detected by the sensor 32 with a reference value $S'_{new}$, filed in the memory M of the electronic control unit ECU, corresponding to a value in a brake fitted with new friction linings 14, 14'. The difference ΔS' between the measured value S' and the stored reference value $S'_{new}$ represents a measurement for the wear of the friction linings 14, 14'.

Subsequently the electronic control unit ECU compares the value ΔS' with a value $S'_{crit}$, likewise filed in the memory M, and issues a warning signal to the driver if the value ΔS' exceeds the stored value $S'_{crit}$. The value $S'_{crit}$ represents a critical wear value of the friction linings 14, 14' at which a change of friction linings 14, 14' should take place.

In a last step the nut 26' is displaced to the right in FIG. 6 out of the actuation position into an initial position. At the start of the displacement of the nut 26' the brake piston 30 displaces jointly with the nut 26' to the right until the brake piston 30 has overcome the brake release play $L_{new}$ and is fixed in this position by the "rollback" seal 44. On further displacement to the right the nut 26' detaches from its abutment against the bottom 46 of the piston and finally reaches its initial position in which the distance between the nut 26' and the bottom 46 of the piston is equal to the value $A_{new}$ in a brake fitted with new friction linings 14, 14'. The path covered by the nut 26' during its displacement to the right thus corresponds to the sum of the brake release play $L_{new}$ and the distance between the nut 26' and the bottom 46 of the piston equal to the value $A_{new}$ in a brake fitted with new friction linings 14, 14'.

Figure 7:
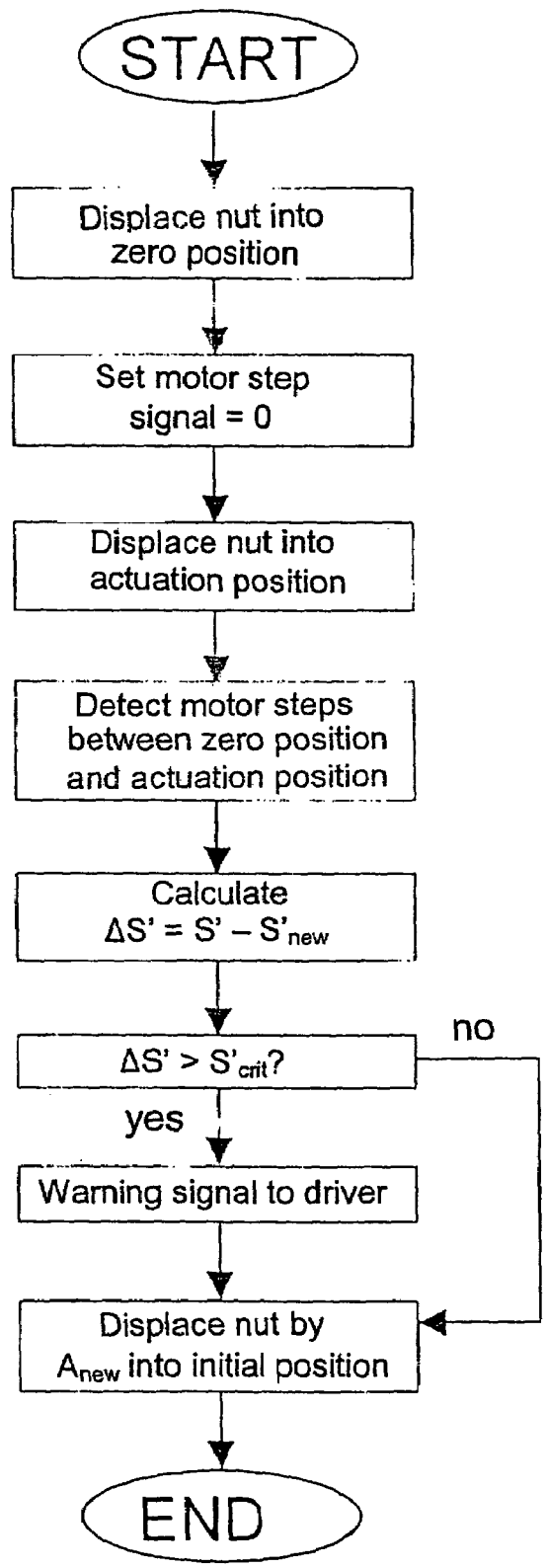
FIG. 7 shows a flow chart in which the sequence of a method for controlling the disc brake shown in FIGS. 5 and 6 is illustrated.
Figure 8:
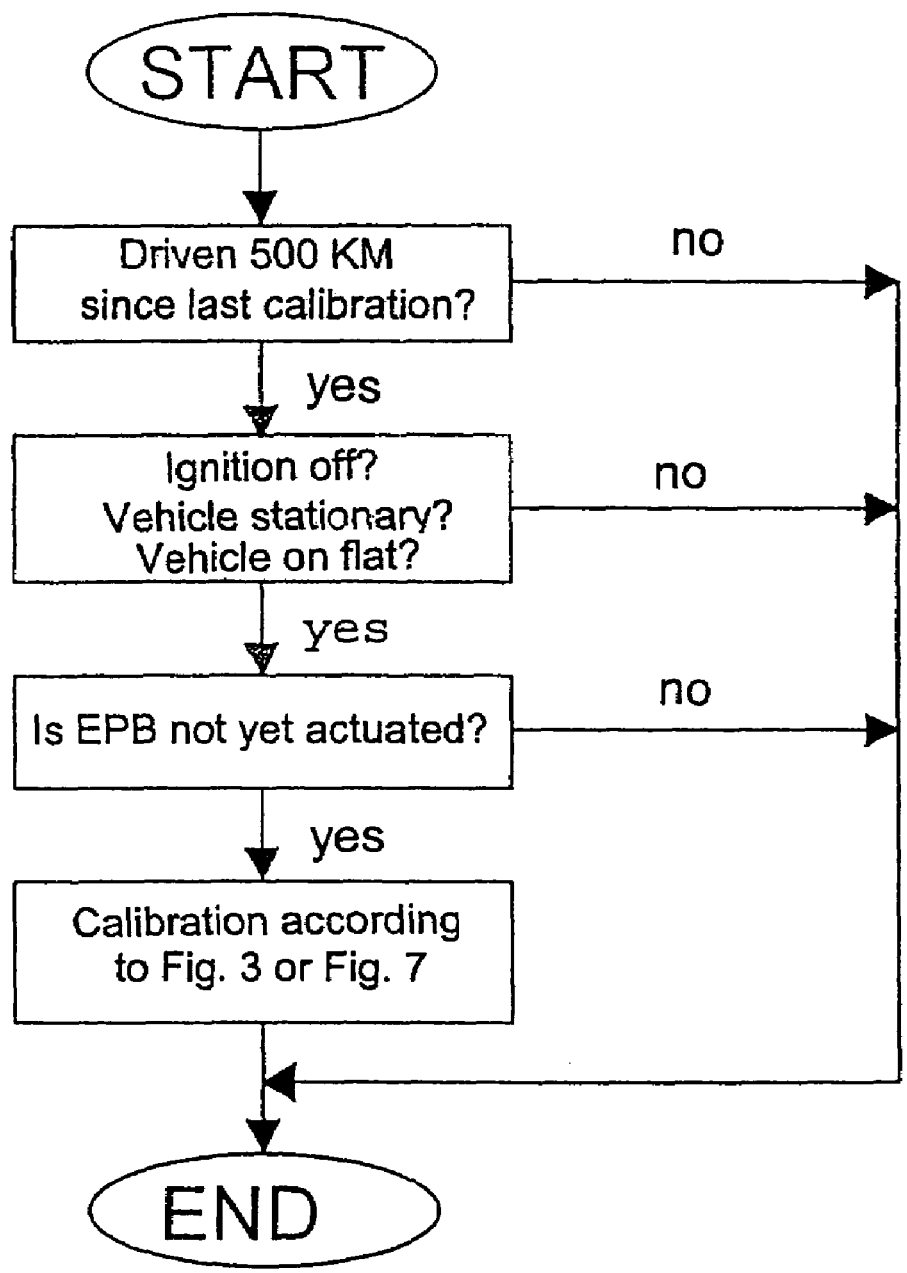
FIG. 8 shows a flow chart in which a first embodiment example of a method for scanning conditions before carrying out the calibration method according to FIG. 3
Figure 9:
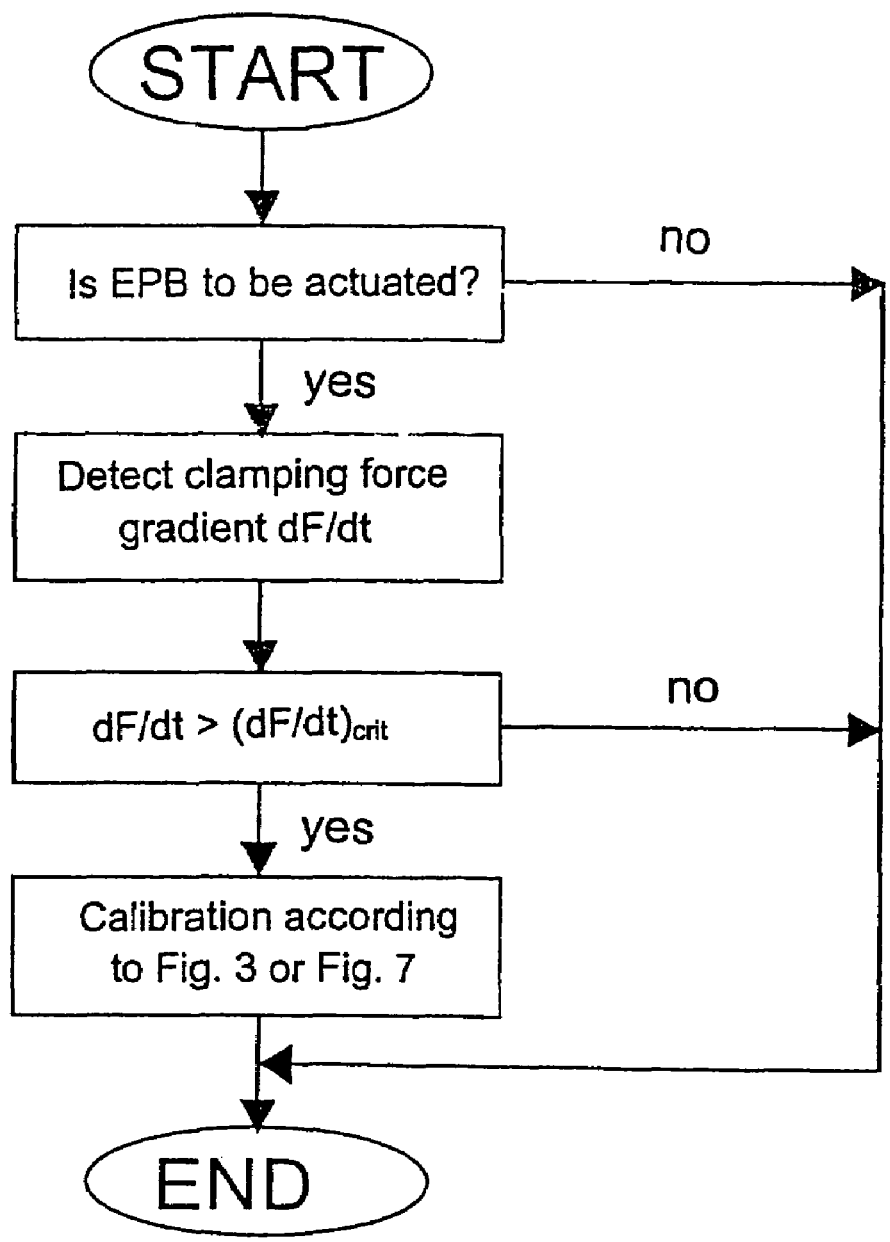
FIG. 9 shows a flow chart in which a second embodiment example of a method for scanning conditions before carrying out the calibration method according to FIG. 3
Figure 10:
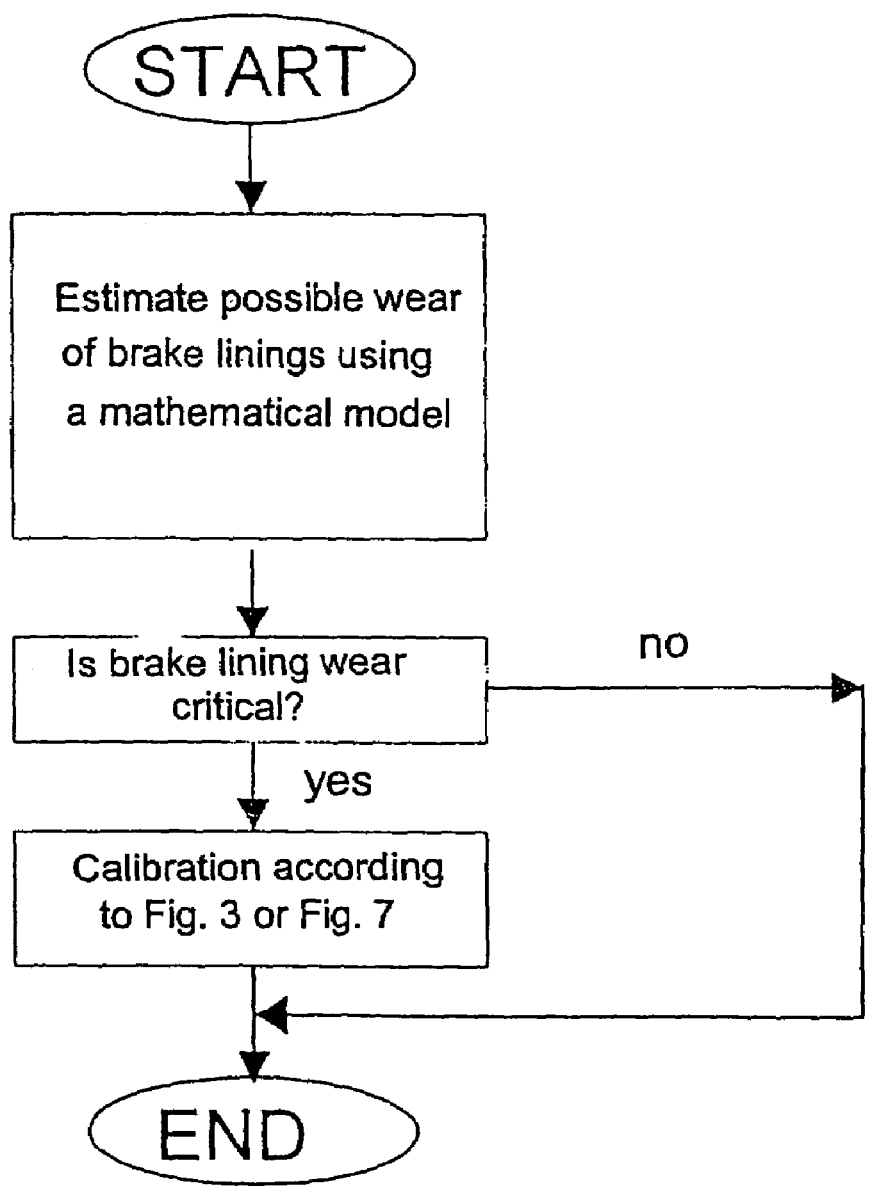
FIG. 10 shows a flow chart in which a third embodiment example of a method for scanning conditions before carrying out the calibration method according to FIG. 3

In FIGS. 8 to 10 three different embodiment examples of a method for scanning operating conditions before carrying out the calibration method according to FIG. 3 or FIG. 7 are illustrated. The performance parameters of the vehicle required for scanning the operating conditions are supplied to the electronic control unit ECU by the sensors S1 . . . Sn.

According to FIG. 8 a first operating condition is met if the vehicle has covered a distance of 500 km since the last calibration of the brake. A second operating condition is met if the ignition of the vehicle is switched off, if the vehicle is stationary and if the vehicle is on the flat (i.e. the vehicle is substantially level). As part of the scanning of a third operating condition it is estimated whether there is still no desire for actuation of an electronic parking brake (EPB), i.e. that the brake is not yet locked. In the embodiment example shown calibration of the brake takes place only if all three operating conditions are met.

In the embodiment example illustrated in FIG. 9 of a method for scanning operating conditions, in a first step it is estimated whether an electronic parking brake (EPB) is actuated. If the first operating condition is met, in a second step the clamping force gradient dF/dt is detected. Then, as second operating condition, there is a check as to whether the clamping force gradient dF/dt exceeds a value $dF/dt_{crit}$ stored in the memory M of the electronic control unit ECU. Similarly to as in the embodiment example shown in FIG. 8, here too a calibration of the brake is carried out only if both operating conditions are met.

According to FIG. 10, in a first step firstly possible brake lining wear is estimated using a mathematical model. It is then tested whether this estimated brake lining wear is critical. This can be done, for example, by a comparison of the estimated (temperature) value with a value stored in the memory M of the electronic control unit ECU. Calibration of the brake according to the method illustrated in FIG. 3 or FIG. 7 finally takes place only if the estimated brake lining wear is critical.

Preferred embodiments are explained below using the example of a motor vehicle with an electronic control unit and a vehicle braking system controllable electronically by a vehicle driver. Temperature determinations for a brake surface of a wheel brake of the vehicle braking system are also described, wherein there is provision to carry out brake surface temperature determinations in this way for several or all the brake surfaces of the vehicle.

For carrying out temperature determinations of single or multiple brake surfaces there is a device which is set up and programmed to carry out single, multiple or all the necessary steps described below for determining the brake surface temperature. Furthermore, a memory unit is provided, which is allocated to the temperature determining device and, for example as explained below, stores performance characteristics. The memory device can also be allocated to the vehicle braking system and/or to the vehicle control unit ECU. It can also be provided that single, multiple or all components are integrated into a uniform construction.

Fundamentally, when the vehicle decelerates or accelerates a constant proportion of the change in its kinetic energy is delivered to the brakes and in particular to the brake surfaces of the vehicle braking system if this is activated on deceleration or acceleration. The thermal energy $W_{therm,b}$ delivered to a brake surface can thus be represented as a function of a change in the kinetic energy of the vehicle $\Delta W_{kin,v}$ as follows:

$$W_{therm,d} = \Delta W_{kin,v} * k,$$

k being a vehicle-specific factor, and in particular a factor specific to the vehicle braking system, which is between zero and one and characterises the energy proportion delivered as thermal energy.

The kinetic energy resulting from the mass of the vehicle and the vehicle speed at which the vehicle is moving at the start of the deceleration or acceleration is used as the initial value as the basis for calculating the change in the kinetic energy of the vehicle. In the case of deceleration of the vehicle, i.e. at the start of a braking process, the speed of the vehicle is estimated at a time which substantially coincides with the activation of the vehicle braking system. In contrast to this it is possible in the case of acceleration of the vehicle that the time at which the vehicle speed is estimated is before or after activation of the vehicle braking system if the vehicle braking system has already been or is still activated when acceleration takes place or is first activated during the acceleration process.

The kinetic energy $W_{kin,start}$ of the vehicle with a mass m, used as a basis as initial value, and the speed $V_{start}$ existing at the start of the braking process and estimated as described above, can be calculated as follows:

$$W_{kin,start} = 0.5 * m * V^2_{start}.$$

To calculate the kinetic energy of the vehicle at the end of the measuring period, which generally ends when activation of the vehicle braking system ends or, if several measuring periods are used for activating the vehicle braking system, is in the period in which the vehicle braking system is activated, the deceleration or acceleration of the vehicle is estimated for the measuring period and the duration thereof. The kinetic energy $W_{kin,b}$ of the vehicle existing at the end of the measuring period can then be calculated as follows:

$$W_{kin,b} = 0.5 * a^2_b * t^2_b$$

$a_b$ characterising the deceleration or acceleration of the motor vehicle and $t_b$ the duration of the measuring period.

From these values for the kinetic energy of the vehicle the change in the kinetic energy and from this the thermal energy $W_{therm,b}$ supplied to the brake surface can be calculated:

$$W_{therm,b} = 0.5 * k * m * (V^2_{start} + a^2_b * t^2_b),$$

a negative value for $a_b$ indicating a deceleration of the vehicle and a positive value for $a_b$ an acceleration of the vehicle.

To estimate the deceleration or acceleration $a_b$ of the vehicle there can be recourse to devices (e.g. deceleration sensors) of the vehicle braking system and/or to data of the vehicle control unit which indicate, for example, the number of revolutions of the wheels.

As the brake surface during operation of the vehicle not only receives thermal energy owing to activation of the vehicle braking system, but is also heated by other thermal sources and cooled owing to the operation of the vehicle and/or active cooling mechanisms, appropriate correcting dimensions are used, which ensure more accurate determining of the temperature of the brake surface. The cooling energy $W_{therm,c}$ generated owing to the operation of the vehicle, which in the first instance represents cooling owing to the air flow arising because of the vehicle speed, is a function of the vehicle speed. As vehicles are not usually fitted with sensors which detect the cooling effect of the air flow, if no appropriate additional sensors are provided, performance characteristics depending on the vehicle speed are used, which allocate appropriate cooling energies $W_{therm,c}$ effective for the brake surface to different vehicle speeds. These performance characteristics are allocated to the vehicle control unit and/or the vehicle braking system or stored in a memory device thereof. To calculate the current cooling energy $W_{therm,c}$, an appropriate value for the current vehicle speed is read out from the performance characteristics. Interpolation methods can also be used for this if there is no appropriate value available for the current vehicle speed.

If the vehicle is stationary (vehicle speed=0) the cooling energy $W_{therm,c}$ can be estimated depending on a function which characterises the cooling course for the vehicle braking system and in particular for the brake surface when stationary, i.e. substantially without further factors which take care of cooling. It is possible to take into account in this whether the vehicle braking system is fully, partially or not at all activated when the vehicle is stationary, i.e. whether forces are acting on the brake surface or not. This should be taken into account, for example, if the vehicle braking system operates as a locking brake or parking brake in which the vehicle is kept stationary in that forces acting on the brake surfaces are generated. In the simplest case a linear function is used which indicates the emission of thermal energy from the brake surface as a function of the time.

As a function of the degrading of the vehicle and the vehicle braking system, in particular of the wheel brakes or the arrangement of the brake surfaces, the brake surfaces may heat up owing to thermal energy originating from other heat sources. This is the case, for example, if the brake surface is arranged close to the vehicle engine or other heat-radiating components, such as, e.g. the exhaust system of the vehicle, and/or the vehicle braking system comprises actuators, electric motors and the like located close to the brake surface.

The thermal energy $W_{therm,b}$ of the brake surface can thus be calculated as follows:

$$W_{therm,b} = 0.5 * k * m(V^2_{start} + a^2_b * t^2_b) - W_{therm,c} + W_{therm,h}.$$

From the thermal energy $W_{therm,b}$ effectively supplied to the brake surface, its temperature is then estimated, taking into account thermal characteristics of the brake surface.

If the vehicle is moving at a constant speed and the vehicle braking system is not activated, the thermal energies $W_{therm,c}$ and $W_{therm,h}$ are taken moveably into account in the calculation of the brake surface temperature(s).

There are further operating states in which the vehicle experiences no change in speed, i.e. is stationary or is being moved at an even speed and the vehicle braking system is activated at least briefly for one, several or all the wheels. This is the case, for example, if the vehicle is located or moving on a sloping roadway and the stationary state or a desired constant speed is being maintained, in that the vehicle braking system generates braking forces by actuation on the part of a vehicle driver and/or by control. Further examples of this are driving states of the vehicle in which the vehicle braking system is actuated by its own control unit and/or controlled by the vehicle control unit in such a way that functions of an anti-blocking system, a traction check, an electronic stability program, acceleration skid control and suchlike are provided.

As each activation of the vehicle braking system leads to a change in the temperatures of the brake surfaces, driving states of this kind can also be taken into account for more accurate determination of the brake surface temperatures. The basic approach of using decelerations and accelerations effective for the vehicle to determine the brake surface temperature is also applied in this case. The initially used deceleration and acceleration processes lead to a change in the vehicle speed, i.e. they represent vehicle decelerations and accelerations. Used here as a basis are therefore not decelerations and accelerations which relate to the vehicle speed but decelerations and accelerations which act on the individual wheels.

Decelerations and accelerations are estimated for this, for example, using the vehicle control on the wheels on which the vehicle braking system generates braking forces and also the time during which braking forces are effective. From this the change in the kinetic energy of a wheel on which braking forces are acting and, based on this, the thermal energy supplied to the wheel can be estimated. Comparably to the previous embodiments, the kinetic energy of the wheel arising from the angular velocity of the wheel and/or a previously estimated kinetic energy, arising from the respective deceleration or acceleration, can be used as initial value as a basis for estimating the change in the kinetic energy of a wheel.

It is further possible in this case to estimate the thermal energy supplied to a brake surface in that the braking forces acting on the wheels are detected or estimated, in order to determine the work carried out on the wheels and from this the thermal energy supplied to the respective brake surfaces in conjunction with the decelerations or accelerations acting on the wheels and the corresponding periods in which braking forces exist.

The two last mentioned ways of determining brake surface temperatures can be used alternatively or jointly, leading in the latter case to a redundant process which can improve temperature determination.

The initially described temperature determination on the basis of a deceleration or acceleration of the vehicle is easier to carry out, as only a deceleration or an acceleration is detected for this. Accordingly, this procedure is particularly suitable for vehicles in which the vehicle control unit (ECU) and the control unit of the vehicle braking system do not provide any information on decelerations and accelerations on individual wheels. This further represents a solution for vehicles which do not comprise devices which provide information on decelerations and accelerations acting on the vehicle. In vehicles of this kind it would simply be necessary to supplement devices, such as computer units, memory units, sensors and suchlike, for example, which can detect at least one vehicle deceleration or acceleration and from this calculate brake surface temperatures.

Determining brake surface temperatures on the basis of decelerations and accelerations acting on individual wheels can be used in appropriately equipped vehicles alternatively or as a supplement to temperature determination for brake surfaces based on a deceleration or acceleration of the vehicle.

Brake surface temperature determination on the basis of a deceleration or acceleration of the vehicle is quicker to carry out, as the individual wheels do not have to be monitored. This can lead to inaccurate brake surface temperature determination, as it is herein assumed that with a deceleration or acceleration of the vehicle the thermal energies transmitted to the brake surfaces are substantially equal. In vehicles in which this cannot be guaranteed, or to check a temperature determination of this kind, temperature determination for brake surfaces based on decelerations or accelerations acting on the individual wheels is suitable as an alternative or redundant process.

An example of the use of determination of the temperature of a brake surface is a vehicle braking system operating as a locking brake or parking brake. In order to secure a stationary vehicle from rolling away it is necessary that the locking brake generates an appropriate minimum braking effect. The forces acting on the brake surfaces by means of the locking brake, abbreviated below to brake application forces, are normally set to a desired, predetermined value. If, for example, after fairly long travel operation of the vehicle the brake surfaces have heated up and thereby expanded, the brake application forces set for the expanded state of the brake surfaces decrease if the brake surfaces cool down when the vehicle is stationary. For a case occurring in practice the temperature of the brake surfaces is in the order of magnitude of 700° C., for example, the brake application forces being in the order of magnitude of 15 kN. After the brake surface temperature has cooled down to an order of magnitude of 350° C. and the brake surfaces have become smaller, so-called shrinking of the lining, in conjunction with this, the brake application forces are now in the order of magnitude of only 9 kN. This can lead to the vehicle no longer being secured against rolling away. If, as described above, the brake surface temperature was estimated when the vehicle was parked, it is then possible while the vehicle is stationary, starting from the brake surface temperature existing on reaching the standstill, to estimate its drop and accordingly to increase the brake application forces. In general the drop in brake application forces when the brake surfaces cool down follows an exponential function, for which reason a first increase in brake application force is usually already necessary after a period of approximately three minutes.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. An electrically actuatable vehicle brake, said vehicle brake comprising:
   a brake piston acting on at least one friction lining, said brake piston displaceable out of an initial position into an actuation position, wherein in said actuation position, said brake piston urges said friction lining against a rotating member of said vehicle brake which can be connected, fixed against relative rotation, to a wheel of a motor vehicle, and wherein said brake piston is actuatable by an element of a transmission unit driven by an electric motor and acting on the brake piston; and
   a device for releasably holding said brake piston in said initial position, such that a predetermined brake release play is kept constant, wherein said brake release play is defined by at least a distance between said at least one friction lining and said rotating member when said brake piston is in said initial position;
   wherein said electric motor can be triggered by an electronic control unit, said electronic control unit being set up to detect performance parameters of at least one of said vehicle, said electric motor, and said vehicle brake, and further being set up and programmed to trigger said electric motor by means of a control and evaluation program running in said electronic control unit in such a way that to calibrate said brake, said element is displaced in response to the detection of at least one predetermined operating condition in a first direction into said actuation position, and then, said element is displaced in a second direction opposite said first direction, along a path the length of which corresponds to a sum of the predetermined brake release play and a predetermined distance between said element and said brake piston when said brake is not actuated; and
   wherein the electronic control unit is set up to trigger the electric motor in such a way that the element of the transmission unit acting on the brake piston is displaced into a predetermined zero position before being displaced into its actuation position and the electronic control unit is further set up to detect a dimension value which is correlated to the length of a path covered by the element between its zero position and its actuation position and to compare the detected dimension value with a stored reference dimension value, the reference dimension value being correlated to the length of a path covered by the element in a vehicle brake fitted with new friction linings.

2. Electrically actuatable vehicle brake according to claim 1, wherein the electronic control unit is set up to detect a dimension correlated to a clamping force and a dimension characteristic of the actuation of the electric motor by appropriate transducers during displacement of the brake piston into its actuation position, in which the brake piston abuts the at least one friction lining against the rotating member, from this to estimate the actuation position of the brake piston at which the friction lining abuts against the rotating member of the vehicle brake and to use this estimated actuation position as the basis for the displacements of at least one of the brake piston and the element of the transmission unit acting on the brake piston.

3. Electrically actuatable vehicle brake according to claim 2, wherein the electronic control unit is set up and programmed to determine an approximation function from the pairs of values of the detected clamping force and the associated dimension characteristic of actuation of the electric motor by means of a method of approximation.

4. Electrically actuatable vehicle brake according to claim 3, wherein the electronic control unit is set up and programmed to determine a polynomial approximation function of at least the second order from at least three pairs of values by a method of approximation.

5. Electrically actuatable vehicle brake according to claim 4, wherein the electronic control unit is set up and programmed to estimate a zero position of the polynomial approximation function with positive gradient or, if a zero position with positive gradient cannot be determined, the minimum of the polynomial approximation function as actuation position of the brake piston at which the friction lining abuts against the rotating member of the vehicle brake.

6. Electrically actuatable vehicle brake according to claim 3, wherein the dimensions characteristic of the actuation of the electric motor comprise the current consumption, path or angle steps of the electric motor.

7. Electrically actuatable vehicle brake according to claim 2, wherein the dimension correlated to the clamping force comprises the clamping force itself, the peripheral force, the braking moment or the frictional force exerted on the roadway by the wheel.

8. Electrically actuatable vehicle brake according to claim 1, wherein the predetermined operating condition is met if the ignition of the vehicle is switched off.

9. Electrically actuatable vehicle brake according to claim 1, wherein the predetermined operating condition is met if the vehicle is stationary.

10. Electrically actuatable vehicle brake according to claim 1, wherein the predetermined operating condition is met if the vehicle brake is not or has not yet been applied.

11. Electrically actuatable vehicle brake according to claim 1, wherein the predetermined operating condition is met if the vehicle is on the flat.

12. The electrically actuatable vehicle brake according to claim 1, wherein the device for for releasably holding said brake piston in said initial position is a "rollback" seal.

13. Electrically actuatable vehicle brake according to claim 1, wherein the electronic control unit is set up to issue a warning signal to the vehicle driver if a difference between the detected dimension and the stored reference dimension exceeds a predetermined value.

14. Electrically actuatable vehicle brake according to claim 1, wherein the predetermined operating condition is met if the vehicle has covered a predetermined distance since the last calibration of the brake.

15. Electrically actuatable vehicle brake according to claim 1, further including a force sensor arranged between the brake piston and the friction lining and generating a signal indicative of a clamping force wherein the predetermined operating condition is met if a dimension correlated to a clamping force gradient exceeds a predetermined critical value.

16. Electrically actuatable vehicle brake according to claim 1, wherein the predetermined operating condition is met if critical wear of a brake lining is established using a mathematical model.

17. A method for controlling an electrically actuatable vehicle brake, the method comprising:

providing a brake piston acting on at least one friction lining, said brake piston displaceable out of an initial position into an actuation position, wherein in said actuation position, said brake piston urges said friction lining against a rotating member of said vehicle brake which can be connected, fixed against relative rotation, to a wheel of a motor vehicle, and wherein said brake piston is actuatable by an element of a transmission unit driven by an electric motor and acting on the brake piston;

providing a device for releasably holding said brake piston in said initial position, such that a predetermined brake release play is kept constant, wherein said brake release play is defined by at least a distance between said at least one friction lining and said rotating member when said brake piston is in said initial position, wherein said electric motor can be triggered by an electronic control unit, said electronic control unit being set up to detect performance parameters of at least one of said vehicle, said electric motor, and said vehicle brake;

determining a desired distance between said element of said transmission unit acting on said brake piston, and said brake piston when said brake is not actuated;

detecting at least one predetermined operating condition;

calibrating said brake, said calibrating step including displacing said element in a first direction into said actuation position in response to the detection of said at least one predetermined operating condition;

displacing said element in a second direction opposite said first direction, along a path the length of which corresponds to a sum of the predetermined brake release play and said predetermined distance between said element and said brake piston when the brake is not actuated;

displacing the element of the transmission unit acting on the brake piston into a predetermined zero position before the element is displaced into its actuation position;

detecting a dimension value which is correlated to the length of a path covered by the element between its zero position and its actuation position; and comparing the detected dimension value with a stored reference dimension value which is correlated to the length of a path covered by the element in a vehicle brake fitted with new friction linings.

18. Method for controlling an electrically actuatable vehicle brake according to claim 17, characterised by the additional step of:

issuing a warning signal to the vehicle driver if a difference between the detected dimension and the stored reference dimension exceeds a predetermined value.

\* \* \* \* \*